(12) United States Patent
Akabori et al.

(10) Patent No.: US 6,856,887 B2
(45) Date of Patent: Feb. 15, 2005

(54) ADAPTIVE CRUISE CONTROL SYSTEM AND METHOD FOR AUTOMOTIVE VEHICLE WITH INTER-VEHICLE DISTANCE CONTROL FUNCTION

(75) Inventors: Kouichi Akabori, Yokohama (JP); Yoshinori Yamamura, Yokohama (JP); Yoji Seto, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 81 days.

(21) Appl. No.: 10/042,195

(22) Filed: Jan. 11, 2002

(65) Prior Publication Data

US 2002/0099491 A1 Jul. 25, 2002

(30) Foreign Application Priority Data

Jan. 19, 2001 (JP) ........................................ 2001-012432

(51) Int. Cl.[7] .............................................. B60K 31/00
(52) U.S. Cl. .......................................... 701/96; 180/179
(58) Field of Search ............................. 701/93–94, 96, 701/110, 118–119, 300–302; 180/170, 178–179; 342/70–71, 104–107, 109–112; 123/349

(56) References Cited

U.S. PATENT DOCUMENTS

| | | |
|---|---|---|
| 5,631,639 A | 5/1997 | Hibino et al. |
| 5,850,176 A | 12/1998 | Kinoshita et al. |
| RE36,470 E | 12/1999 | Woll et al. |
| 6,044,321 A * | 3/2000 | Nakamura et al. ............ 701/96 |
| 6,317,073 B1 * | 11/2001 | Tamatsu et al. ............... 342/70 |

FOREIGN PATENT DOCUMENTS

| | | |
|---|---|---|
| EP | 1 080 937 A2 | 12/2000 |
| JP | 2000-168395 | 6/2000 |

OTHER PUBLICATIONS

P. Ioannou et al., "Intelligent Cruise Control: Theory and Experiment", Proceedings of the Conference on Decision and Control, IEEE, vol. 3, Conf. 32, Dec. 15–17, 1993, pp. 1885–1890, XP010116579.
K. Youcef–Toumi et al., "The Application of Time Delay Control to an Intelligent Cruise Control System", Proceedings of the American Control Conference, IEEE, vol. 2, Jun. 24–26, 1992, pp. 1743–1747, XP00343593.

* cited by examiner

*Primary Examiner*—Thu V. Nguyen
(74) *Attorney, Agent, or Firm*—Foley & Lardner LLP

(57) ABSTRACT

In adaptive cruise control method for an automotive vehicle, an inter-vehicle distance between the vehicle and a preceding vehicle which is traveling ahead of the vehicle is detected, a velocity of at least one of the vehicle and the preceding vehicle is detected, a traveling state of the vehicle is controlled on the basis of the detected inter-vehicle distance and a target inter-vehicle distance, a delay is provided for one of the detected velocities of the vehicle and the preceding vehicle which is used to set the target inter-vehicle distance at a time of a detection of one of the velocities of the vehicle and the preceding vehicle which is used to set the target inter-vehicle distance, and the target inter-vehicle distance is set on the basis of the detected velocity of one of the vehicle and the preceding vehicle for which the delay is provided.

14 Claims, 9 Drawing Sheets

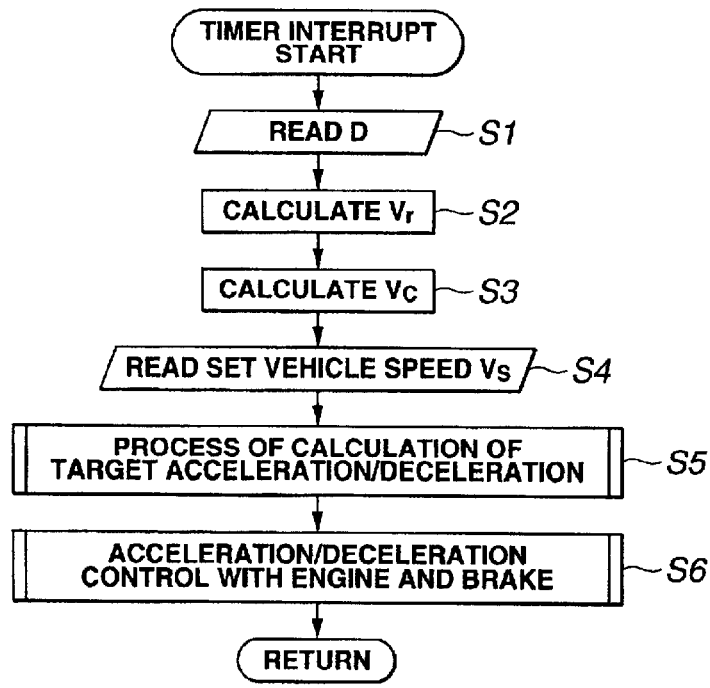
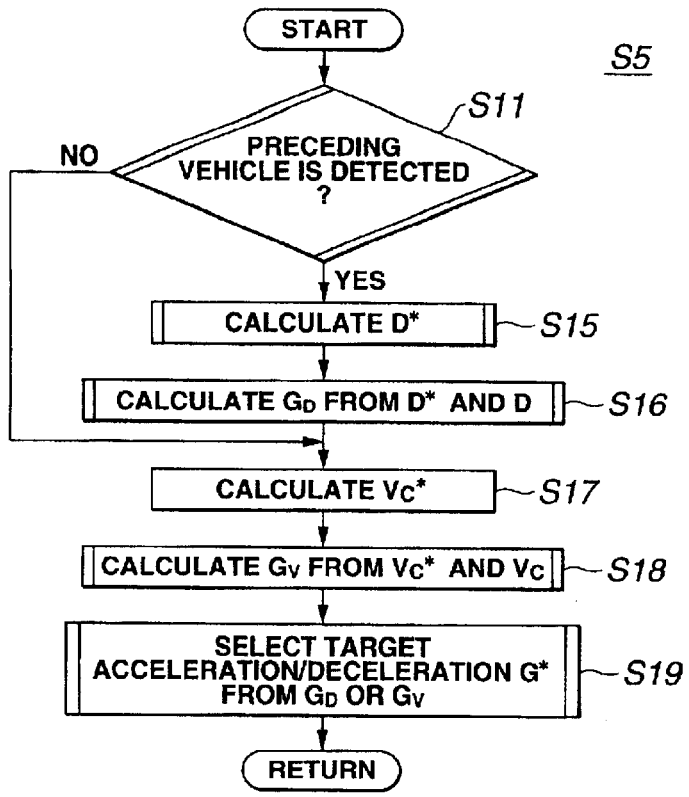

ADAPTIVE CRUISE CONTROL SYSTEM AND METHOD FOR AUTOMOTIVE VEHICLE WITH INTER-VEHICLE DISTANCE CONTROL FUNCTION

BACKGROUND OF THE INVENTION

1. Field of the Invention

The present invention relates to adaptive cruise control system and method for an automotive vehicle (hereinafter, also called a host vehicle) with an inter-vehicle distance control function to follow a preceding vehicle which is traveling ahead of the host vehicle.

2. Description of the Related Art

A Japanese Patent Application First Publication No. 2000-168395 published on Jun. 20, 2000 exemplifies a previously proposed adaptive cruise control system. In the previously proposed vehicular cruise control system disclosed in the above-identified Japanese Patent Application First Publication, an inter-vehicle distance between the host vehicle and the preceding vehicle is detected and a cruise speed run is carried out at a constant speed (so-called, a set cruise speed) which is set by a vehicular driver of the host vehicle. For example, [if] the preceding vehicle [becomes approached to] may approach the host vehicle or becomes spaced apart from the host vehicle so that the inter-vehicle distance is varied. At this time, the previously proposed vehicular adaptive cruise control system adjusts a braking force or a driving force of the host vehicle so that the inter-vehicle distance is made substantially equal to a target inter-vehicle distance. As described above, a vehicular running state is feedback controlled. In addition, in order to calculate the target inter-vehicle distance, for example, a traveling speed of the preceding vehicle is detected, is multiplied by an inter-vehicle time duration, and is added to a distance to make the host vehicle stop to calculate the target inter-vehicle distance.

It is noted that the inter-vehicle distance time duration is defined as a time duration required for the host vehicle to be reached to the present position of the preceding vehicle (in other words, a time required for the host vehicle to run by a distance corresponding to the inter-vehicle distance). For example, the inter-vehicle distance time duration is previously set as about two seconds. It is also noted that the distance to make the vehicle stop corresponds to a distance left between the host vehicle and the preceding vehicle when the host vehicle stops while the preceding vehicle is stopped and is preset to, for example, 2 meters. It is also noted that since when the host vehicle is running at the constant speed at a predetermined inter-vehicle distance, viz., the target inter-vehicle distance, the traveling speed of the preceding vehicle is exactly equal to or substantially equal to that of the host vehicle, the traveling speed of the host vehicle may be used to calculate the target inter-vehicle distance.

SUMMARY OF THE INVENTION

However, in the previously proposed cruise control apparatus disclosed in the above-described Japanese Patent Application First Publication, the feedback control is executed in such a manner that the detected inter-vehicle distance is made substantially equal to the target inter-vehicle distance. Hence, upon the detection that the inter-vehicle distance becomes different from the target inter-vehicle, an acceleration or deceleration request is issued according to a difference value thereof. Suppose herein that, for example, the target inter-vehicle distance is set according to the traveling speed of the preceding vehicle, the preceding vehicle is decelerated. At this time, since the inter-vehicle distance becomes short and the target inter-vehicle distance also becomes short, an absolute value of a vehicular deceleration demanded for the host vehicle becomes small. Consequently, the vehicular driver feels that a control response characteristic becomes worsened. This case also applies to a case where the preceding vehicle becomes accelerated. Then, since the acceleration demanded for the host vehicle becomes small in the same manner as described in the case of the vehicular deceleration, so that the driver feels that the control response characteristic also becomes worsened.

A technique to improve the acceleration or deceleration response characteristic can be thought to include that a feedback gain is made large which is used in the feedback control between the target inter-vehicle distance and the detected inter-vehicle distance. However, using such the technique as described above causes the acceleration or deceleration during an ordinary follow run to the preceding vehicle to be excessively sensitive and a vehicular comfortability can conversely be worsened.

It is hence an object of the present invention to provide adaptive cruise control system and method for an automotive vehicle with the inter-vehicle distance control function which can provide a favorable response characteristic for the acceleration or deceleration of the preceding vehicle without worsening the vehicular comfortability.

According to one aspect of the present invention, there is provided an adaptive cruise control system for an automotive vehicle, comprising: an inter-vehicle distance detecting section (12, 20) that detects a presence of a preceding vehicle which is traveling ahead of the vehicle and detects an inter-vehicle distance between the vehicle and the preceding vehicle; a vehicular velocity detecting section (13L, 13R, 20) that detects a velocity of at least one of the vehicle and the preceding vehicle; a target inter-vehicle distance setting section (20) that sets a target inter-vehicle distance on the basis of at least one of the velocities of the vehicle and the preceding vehicle; a vehicular traveling speed controlling section (20) that controls a traveling state of the vehicle on the basis of the detected inter-vehicle distance and the target inter-vehicle distance; and a delay providing section (20) that provides a delay for one of the detected velocities of the vehicle and the preceding vehicle which is used to set the target inter-vehicle distance at a time of a detection of one of the velocities of the vehicle and the preceding vehicle which is used to set the target inter-vehicle distance, the target inter-vehicle distance setting section setting the target inter-vehicle distance on the basis of the detected velocity for which the delay is provided by the delay providing section.

According to another aspect of the present invention, there is provided an adaptive cruise control method for an automotive vehicle, comprising: detecting a presence of a preceding vehicle which is traveling ahead of the vehicle; detecting an inter-vehicle distance between the vehicle and the preceding vehicle; detecting a velocity of at least one of the vehicle and the preceding vehicle; controlling a traveling state of the vehicle on the basis of the detected inter-vehicle distance and a target inter-vehicle distance; providing a delay for one of the detected velocities of the vehicle and the preceding vehicle which is used to set the target inter-vehicle distance at a time of a detection of one of the velocities of the vehicle and the preceding vehicle which is used to set the target inter-vehicle distance; and setting the target inter-vehicle distance on the basis of the detected velocity of one of the vehicle and the preceding vehicle for which the delay is provided.

This summary of the invention does not necessarily describe all necessary features so that the invention may also be a sub-combination of these described features.

BRIEF DESCRIPTION OF THE DRAWINGS

FIG. 2 is an operational flowchart of a preceding vehicle following control procedure carried out by an adaptive cruise controller shown in FIG. 1.

FIG. 3 is a detailed flowchart of a subroutine executed at a step S5 shown in FIG. 2.

DETAILED DESCRIPTION OF THE PREFERRED EMBODIMENTS

Reference will hereinafter be made to the drawings in order to facilitate a better understanding of the present invention.

Figure 1:
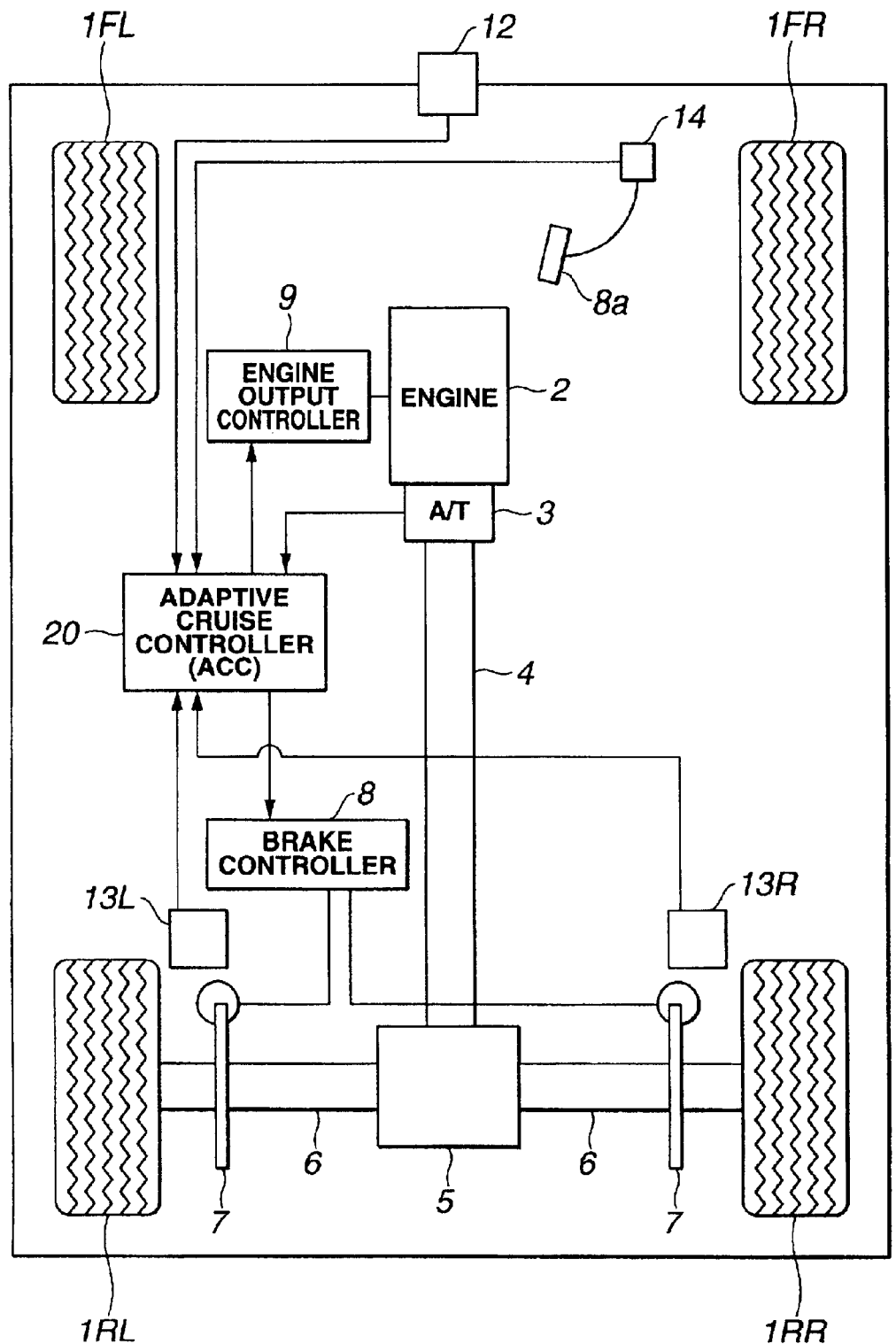
FIG. 1 is a system configuration view of a rear-wheel-drive vehicle to which an adaptive cruise control system with an inter-vehicle distance control function in a preferred embodiment according to the present invention is applicable.

FIG. 1 shows a schematic block diagram of a system configuration of a rear-wheel-drive vehicle to which an adaptive cruise control system with an inter-vehicle distance control function in a preferred embodiment according to the present invention is applicable. In FIG. 1, a driving force of an engine 2 is transmitted to rear left and right road wheels (driven wheels) 1RL and 1RR via an automatic transmission 3, propeller shaft 4, a final speed-reduction gear unit 5, and an wheel axel 6. In FIG. 1, reference signs of 1FL and 1FR denote non-driven wheels of front left and right road wheels.

In addition, rear left and right road wheels 1RL and 1RR are provided with disc brakes 7 to generate braking forces, respectively. A brake fluid pressures applied to these disc brakes 7 is controlled by a brake controller 8. It is noted that brake controller 8 generates the brake fluid pressure in accordance with a depression depth of a brake pedal 8a and generates the brake fluid pressure in accordance with a brake fluid pressure command value issued from an adaptive cruise controller (ACC) 20.

In addition, an engine output controller 9 is installed on engine 2 to control an output of engine 2. Two methods of engine output control can be considered. That is to say, one of the methods is to control an engine speed by adjusting an opening angle of a throttle valve and another method is to control an engine idling speed of engine 2 by adjusting an opening angle of an idle control valve of engine 2. In the preferred embodiment, the former method of controlling the engine speed by adjusting the opening angle of the throttle valve is adopted.

An inter-vehicle distance sensor 12 is installed on a front lower part of a vehicle body of the host vehicle which is constituted by a radar unit (inter-vehicle distance detecting section) which detects a presence of a preceding vehicle which is traveling ahead of the host vehicle and detects an inter-vehicle distance from the host vehicle to the preceding vehicle. In addition, wheel speed sensors 13L and 13R are disposed to detect wheel velocities of the rear left and right road wheels 1RL and 1RR.

Furthermore, each output signal of inter-vehicle distance sensor 12, wheel speed sensors 13L and 13R, and a brake pedal switch 14 is inputted to adaptive cruise controller 20. Adaptive cruise controller 20 controls brake controller 8 and engine output controller 9 on the basis of the inter-vehicle distance D and wheel velocities $Vw_{RL}$ and $Vw_{RR}$ detected by wheel speed sensors 13L and 13R. Hence, adaptive cruise controller 20 executes a steady-state preceding vehicle following control which makes the host vehicle follow the preceding vehicle maintaining an appropriate inter-vehicle distance between the host vehicle and the preceding vehicle and controls a vehicular running state by accelerating or decelerating the host vehicle in response to the acceleration or deceleration of the preceding vehicle.

Next, a calculation procedure for the preceding vehicle following control to be executed by adaptive cruise controller 20 will be described with reference to an operational flowchart shown in FIG. 2.

The calculation process shown in FIG. 2 is a timer interrupt routine executed whenever a predetermined control period of time ΔT (for example, 10 milliseconds) has passed. It is noted that each controller 8, 9, and 20 includes a microcomputer CPU (Central Processing Unit), ROM (Read Only Memory), RAM (Random Access Memory), Input Port, Output Port, a timer, a timer controller, and a common bus. It is noted that although, in the flowchart shown in FIG. 2, steps to communicate with the other controller are not provided, for example, any information obtained from the flowchart is stored at any time into a storage device such as RAM and the required information is read from the storage device. In addition, each controller 8, 9, and 20 performs a mutual communication and the required information is always read from any one of the controllers 8, 9, 20 which performs a management of all controllers. The supplied information is at any time stored into the corresponding storage device.

Referring to FIG. 2, at a step S1, adaptive cruise controller 20 reads an actual inter-vehicle distance D detected by inter-vehicle distance sensor 12 between the host vehicle and the preceding vehicle. At the next step S2, adaptive cruise controller 20 calculates a relative velocity Vr between the host vehicle and the preceding vehicle from a variation rate between the presently read inter-vehicle distance D at step S1 and a previously read inter-vehicle distance D thereat. At the next step S3, adaptive cruise controller 20 calculates the vehicular velocity of the host vehicle from an average value between the road wheel velocities $Vw_{RL}$ and $Vw_{RR}$. Then, the routine goes to a step S4, adaptive cruise controller 20 reads set vehicle speed Vs set by the driver. At the next step S5, adaptive cruise controller 20 calculates a target acceleration/deceleration in accordance with a calculation process as will be shown in FIG. 3.

At the next step S6, adaptive cruise controller 20 implements an acceleration/deceleration control using engine 2 and brake system via engine controller 8 and brake controller 9 in accordance with individual calculation processes (not shown) and the routine shown in FIG. 2 is returned to a main routine.

Next, FIG. 3 shows a detailed flowchart executed at step S5 in FIG. 2. At a first step S11, adaptive cruise controller 20 determines whether the preceding vehicle has been detected in accordance with an individual calculation process (not shown). If the preceding vehicle has been detected (Yes) at step S11, the routine goes to a step S15. If No at step S15, the routine goes to a step S17. At step S15, adaptive cruise controller 20 calculates a target inter-vehicle distance D* in accordance with a calculation process shown in FIG. 4 and the routine goes to a step S16.

Figure 5:
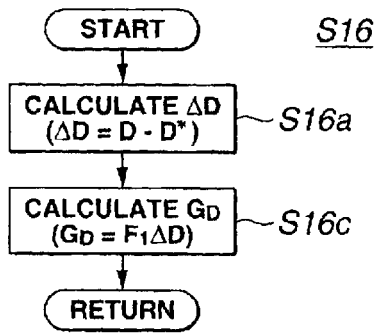
FIG. 5 is a detailed flowchart of a subroutine executed at a step S16 shown in FIG. 3.

At step S16, adaptive cruise controller 20 calculates an inter-vehicle distance priority target acceleration/deceleration $G_D$ from target inter-vehicle distance D* and actual inter-vehicle distance D in accordance with a calculation process shown in FIG. 5. Then, the routine goes to a step S17.

At step S17, adaptive cruise controller 20 calculates a target vehicular velocity Vc* (target velocity of the host vehicle) and the routine goes to a step S18. The target vehicular velocity Vc* is set so that the host vehicle velocity Vc is increased at a constant acceleration to the set vehicle speed Vs when the host vehicle velocity Vc calculated as shown in FIG. 2 is smaller than set vehicle speed Vs. If not, the set vehicular velocity Vs is directly set to target vehicular velocity Vc*. At step S18, adaptive cruise controller 20 calculates a vehicular velocity priority target acceleration/deceleration Gv from target vehicular velocity Vc* and vehicular velocity Vc in accordance with the calculation process shown in FIG. 6 as will be described later. Then, the routine goes to a step S19. At step S19, adaptive cruise controller 20 selects target acceleration/deceleration G* in accordance with a calculation process shown in FIG. 7 as will be described later.

Next, the calculation process in FIG. 4 executed at step S15 in FIG. 3 will be described below. At a step S15a, adaptive cruise controller 20 reads the host vehicle velocity Vc calculated at step S3 shown in FIG. 2. At the next step S15b, adaptive cruise controller 20 reads the relative velocity Vr calculated at step S2 shown in FIG. 2.

At a step S15c, adaptive cruise controller 20 adds the host vehicular velocity Vc read at step S15a to the relative velocity Vr read at step S15c calculated at step S15b to calculate a velocity $V_F$ of the preceding vehicle. At the next step S15d, adaptive cruise controller 20 determines if velocity of the preceding vehicle $V_F$ calculated at step S15c is equal to or smaller (lower) than a first predetermined velocity value of 40 Km/h. If Yes at step S15d, the routine goes to a step S15e. If No at step S15, the routine goes to a step S15f. At step S15f, adaptive cruise controller 20 determines if velocity of the preceding vehicle $V_F$ is equal to or smaller than a second predetermined velocity value of 50 Km/h. If Yes at step S15f, the routine goes to a step S15g. If No at step S15f, the routine goes to a step S15h. At step S15h, adaptive cruise controller 20 determines whether velocity $V_F$ of the preceding vehicle is equal to or smaller than a third predetermined value of 60 Km/h. If Yes at step S15h, the routine goes to a step S15i. If No at step S15h, the routine goes to a step S15j. At step S15j, adaptive cruise controller 20 determines if velocity of the preceding vehicle $V_F$ is equal to or smaller than a fourth predetermined value of 70 Km/h. If Yes at step S15j, the routine goes to a step S15k. If No at step S15j, the routine goes to a step S15m. At step S15m, adaptive cruise controller 20 determines if velocity of the preceding vehicle $V_F$ is equal to or smaller than a fifth predetermined value of 80 Km/h, If Yes at step S15n, the routine goes to a step S15n. If No at step S15m, the routine goes to a step S15p.

At step S15e, adaptive cruise controller 20 sets the velocity of the preceding vehicle fifth control number of times before the present time $V_{F5}$ to a delay processed velocity of the preceding vehicle $V_{FF}$. At step S15g, adaptive cruise controller 20 sets velocity of the preceding vehicle fourth control numbers of times before the present time $V_{F4}$ to delay processed velocity of the preceding vehicle $V_{FF}$. At step S15i, adaptive cruise controller 20 sets the velocity of the preceding vehicle third control number of times before the present time $V_{F3}$ to delay processed velocity of the preceding vehicle $V_{FF}$. At step S15k, adaptive cruise controller 20 sets velocity of the preceding vehicle twice numbers before the present time to the delay processed vehicular velocity of the preceding vehicle $V_{FF}$. At step S15p, adaptive cruise controller 20 sets the present vehicular velocity of the preceding vehicle $V_{FF}$ to the delay processed vehicular velocity of the preceding vehicle $V_F$.

At a step S15q, adaptive cruise controller 20 calculates target inter-vehicle distance D* by multiplying delay processed velocity of the preceding vehicle $V_{FF}$ by an inter-vehicle time duration α and by adding the result of multiplication to a predetermined distance β during the stop of the host vehicle (D*=α×$V_{FF}$+β). It is noted that numerical values for the inter-vehicle velocity α and the distance during the vehicular stop β are used for those described above. At the next step S15r, adaptive cruise controller 20 updates the vehicular velocity of the preceding vehicle $V_{F5}$ through $V_F$ as follows: $V_F→V_{F1}$, $V_{F1}→V_{F2}$, $V_{F2}→V_{F3}$, $V_{F3}→V_{F4}$, and $V_{F4}→V_{F5}$. Then, the routine goes to step S16 shown in FIG. 3.

FIG. 5 shows the detailed flowchart of the calculation process of step S16 shown in FIG. 3.

At a step S16a, adaptive cruise controller 20 calculates a difference ΔD between target and actual inter-vehicle distances (ΔD=D−D*). At the next step S16c, adaptive cruise controller 20 calculates inter-vehicle distance priority target acceleration/deceleration $G_D$ by multiplying difference $\Delta D$ of the inter-vehicle distance calculated at step S16a by a predetermined gain $F_1$ ($G_D = F_1 \times \Delta D$). Then, the routine goes to step S17 shown in FIG. 3.

Figure 6:
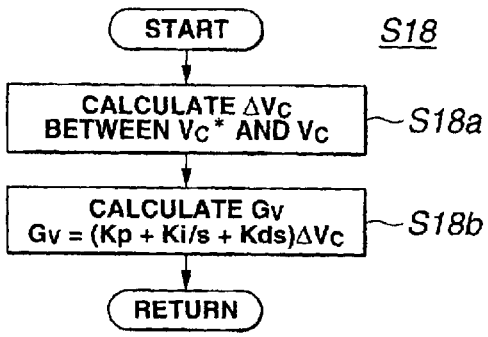
FIG. 6 is a detailed flowchart of a subroutine executed at a step S18 shown in FIG. 3.

Next, FIG. 6 shows a detailed flowchart of step S18 shown in FIG. 3.

At a step S18a, adaptive cruise speed controller 20 calculates a difference $\Delta Vc$ in the vehicular velocity between target vehicular velocity V* calculated at step S17 shown in FIG. 3 from the host vehicular velocity Vc calculated at step S3 of the calculation process at step S3 shown in FIG. 2. At a step S18a, adaptive cruise speed controller 20 calculates vehicular velocity priority target acceleration/deceleration $G_V$ from a total sum of a value of the vehicular velocity difference $\Delta Vc$ multiplied by a proportional gain Kp, an integration value of the vehicular velocity difference $\Delta Vc$ multiplied by a differential gain Ki, and a differential value of the vehicular velocity difference $\Delta Vc$ multiplied by a differential value Kd ($G_V = (Kp + Ki/s + Kds)\Delta Vc$). Then, the routine goes to step S19 shown in FIG. 3. It is noted that s denotes a differential operator.

Figure 7:
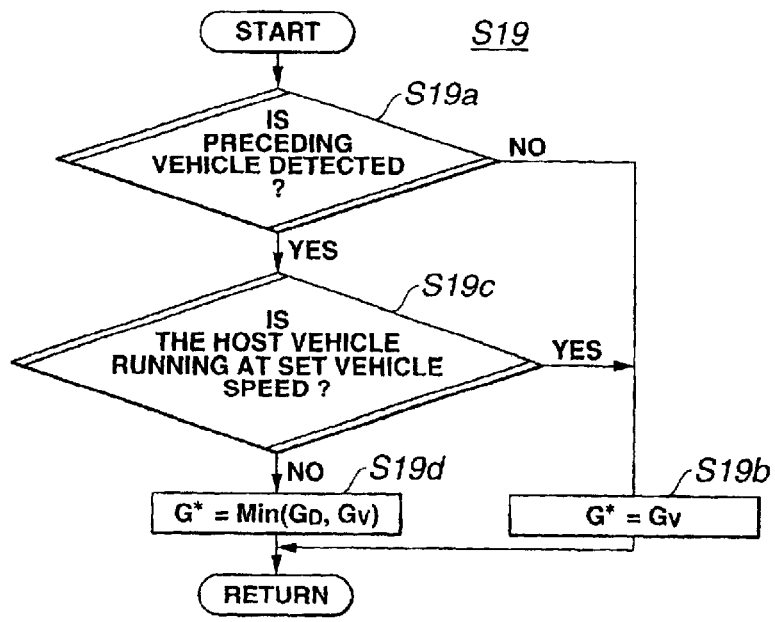
FIG. 7 is a detailed flowchart of a subroutine executed at a step S19 shown in FIG. 3.

FIG. 7 shows a detailed flowchart of step S19 shown in FIG. 3.

At a step S19a, adaptive cruise controller 20 determines whether the preceding vehicle has been detected in accordance with an individual calculation process (not shown). If the preceding vehicle has been detected at step S19a, the routine goes to step S19c. If No at step S19a, the routine goes to a step S19b. At step S19c, adaptive cruise controller 20 determines if the host vehicle is running at set vehicle speed Vs according to whether the host vehicle velocity is substantially equal to or is approximated to the set vehicle speed Vs. If Yes at step S19c, adaptive cruise controller 20 sets the vehicular velocity priority target acceleration/deceleration Gv calculated at the step S18 shown in FIG. 6 to the target acceleration/deceleration G* and the routine goes to step S6 shown in FIG. 2 (G*=$G_V$). At step S19d, adaptive cruise controller 20 sets either one of inter-vehicle distance priority target acceleration/deceleration $G_D$ calculated at the calculation process shown in FIG. 5 or the vehicular velocity priority acceleration/deceleration Gv calculated at the calculation process shown in FIG. 6 whose absolute value is smaller to target acceleration/deceleration G* and goes to step S6 of the calculation process shown in FIG. 2.

According to the above-described series of processes, relative velocity Vr is calculated at the next step S2 from inter-vehicle distance D read at step S1 of the calculation process shown in FIG. 2. At the step S3, the host vehicle velocity Vc is calculated from wheel velocities $Vw_{RL}$ and $Vw_{RR}$ and the set vehicular velocity Vs is read at step S4, and the target acceleration/deceleration G* is carried out at step S5 so that the acceleration/deceleration control at step S6 is carried out according to the determined target acceleration/deceleration.

In order to calculate the target acceleration/deceleration G*, the presence or absence of the preceding vehicle is determined at step S11 of the calculation process shown in FIG. 3. If the preceding vehicle is present, target inter-vehicle distance D* is calculated in accordance with the calculation process shown in FIG. 4 carried out at step S15. Then, inter-vehicle distance priority acceleration/deceleration $G_D$ is calculated in accordance with the calculation process shown in FIG. 5 carried out at step S16 from the difference value between target inter-vehicle distance D* and actual inter-vehicle distance D. On the other hand, if no preceding vehicle is present, the above-described inter-vehicle distance priority target acceleration/deceleration $G_D$ is not calculated. Target vehicular velocity Vc* at step S17 of FIG. 3 is calculated. Vehicular velocity priority acceleration/deceleration Gv is calculated in accordance with the calculation process shown in FIG. 6 carried out at step S18 from the difference value between target vehicular velocity Vc* and actual host vehicular velocity Vc. It is noted that, in a case where the preceding vehicle is present, vehicular velocity priority target acceleration/deceleration Gv is calculated in the same manner as described above. Then, according to the calculation process shown in FIG. 7 carried out at step S19 of the calculation process shown in FIG. 3, if the preceding vehicle is present and the vehicle is not running at the set vehicle speed Vs, either one of the inter-vehicle distance or the vehicular velocity priority target acceleration/deceleration $G_D$ or $G_V$ whose absolute value is smaller than the other is the final acceleration/deceleration G*. If the preceding vehicle is not present or the vehicle is running at the set vehicle speed Vs, the vehicular velocity priority target acceleration/deceleration $G_V$ is the final target acceleration/deceleration G*. Hence, when the host vehicle is running to follow the preceding vehicle, the acceleration or deceleration is controlled so that an appropriate inter-vehicle distance can be maintained in accordance with the velocity of the host vehicle. On the other hand, if the host vehicle is not following the preceding vehicle, the control priority is taken on set vehicle speed Vs to control the acceleration/deceleration of the host vehicle.

Figure 4:
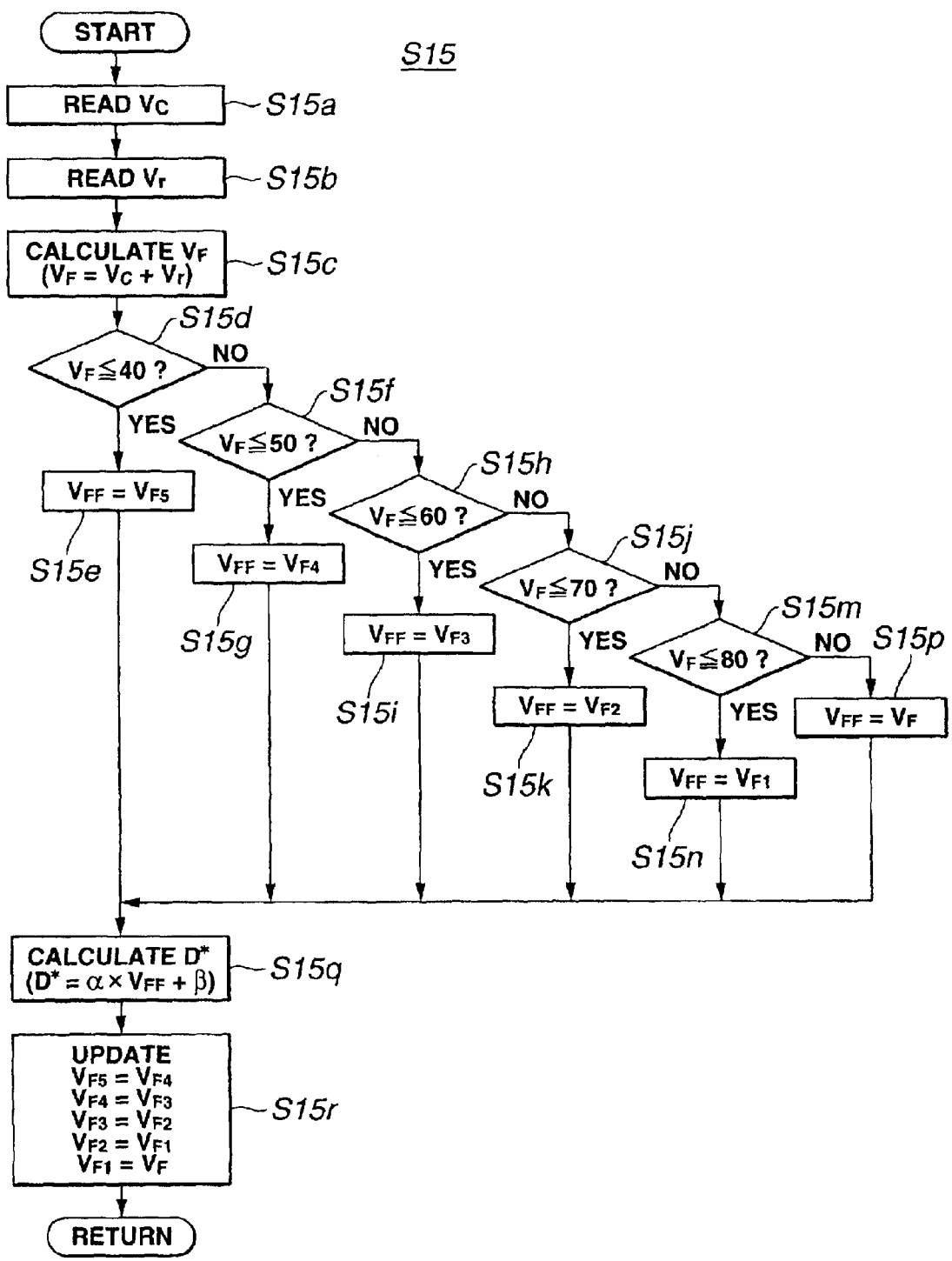
FIG. 4 is a detailed flowchart of a subroutine executed at a step S15 shown in FIG. 3.

It is noted that target inter-vehicle distance D* used to calculate inter-vehicle distance priority target acceleration/deceleration $G_D$ is calculated in accordance with the calculation process shown in FIG. 4 carried out at step S15 of calculation process shown in FIG. 3. In this calculation process, target inter-vehicle distance D* is calculated using the preceding vehicle velocity $V_F$ in principle. However, delay processed preceding vehicle velocity $V_{FF}$ used to calculate target inter-vehicle distance D* has a larger delay as the preceding vehicle velocity $V_F$ becomes lower.

In details, if preceding vehicle velocity $V_F$ is equal to or lower than 40 Km/h, the vehicular velocity $V_F$ of the preceding vehicle fifth number of times in control number of times before the present velocity $V_F$ of the preceding vehicle, i.e., fifth number of times previously detected preceding vehicle velocity $V_F$ is set to delay processed preceding vehicular velocity $V_{FF}$. In the similar manner, if the preceding vehicle velocity $V_F$ is equal to or lower than 50 Km/h but in excess of 40 Km/h, velocity $V_F$ of the preceding vehicle fourth number of times in control number of times before the present velocity $V_F$ of the preceding vehicle, i.e., fourth number of times previously detected preceding vehicle velocity $V_{F4}$ is set to delay processed preceding vehicular velocity $V_{FF}$.

If 50 Km/h<$V_F \leq$60 Km/h, the preceding vehicle velocity third number of times in control number of time before the present preceding velocity, i.e., three times previous preceding vehicle velocity $V_{F4}$ is set to the delay processed preceding vehicle velocity $V_{FF}$. If 60 Km/h<$V_F \leq$70 Km/h, the preceding vehicle velocity $V_F$ twice in control number of times before the present preceding vehicle velocity $V_F$ is set to delay processed preceding vehicle velocity $V_{FF}$. If 70 Km/h<$V_F \leq$80 Km/h, the preceding vehicle velocity $V_F$ one number of times (once) previous preceding vehicle velocity $V_{F1}$, i.e., the previous preceding vehicle velocity is set to delay processed preceding vehicle velocity $V_{FF}$. These series of processes mean that, even if the preceding vehicle velocity $V_F$ is varied due to the acceleration or deceleration of the preceding vehicle, delay processed preceding vehicle velocity $V_{FF}$ is used in stead of present preceding vehicle velocity $V_F$ so that a variation in target inter-vehicle distance D* is delayed (since the control time duration is very short, the delay is slight). As described in the preferred embodiment, in such a case where a feedback control as to make actual inter-vehicle distance D substantially equal to target inter-vehicle distance D* is performed, difference value ΔD between target inter-vehicle distance D* and actual inter-vehicle distance D is small as its absolute value as compared with no delay case or is a value in an opposite direction to the difference value obtained in the case of no delay. In other words, even if the difference value in nature is a positive value, a negative value is often obtained. Even if the difference value in nature is a positive value, a negative value is often obtained.

For example, although, due to the deceleration of the preceding vehicle target inter-vehicle distance D* is short, the actual inter-vehicle distance D is longer than target inter-vehicle distance D*. At this time, difference value ΔD of target inter-vehicle distance value D* from actual inter-vehicle distance D indicates a positive value. As described above, since difference value ΔD of target inter-vehicle distance D* from actual inter-vehicle distance D indicates a positive value. As described above, since difference value ΔD between target inter-vehicle distance D* and actual inter-vehicle distance D is represented by a positive value, actual inter-vehicle distance D is shortened. Hence, it is not necessary to decelerate at least so large at anymore or it is not necessary to decelerate too large even if decelerated.

However, when target inter-vehicle distance D* is calculated using delay processed preceding vehicular velocity $V_{FF}$ in place of the present preceding vehicle velocity as described above, target inter-vehicle distance D* is calculated using delay processed preceding vehicular velocity as described above, target inter-vehicle distance D* is calculated using delay processed preceding vehicle vehicular velocity $V_{FF}$. At this time, target inter-vehicle distance D* is calculated using delay processed preceding vehicle vehicular velocity $V_{FF}$. At this time, target inter-vehicle distance D* becomes larger than the original value. Hence, a difference value ΔD between target inter-vehicle distance D* and actual inter-vehicle distance D becomes larger than the original value or negative value. Hence, it becomes necessary to maintain the inter-vehicle distance or to elongate the inter-vehicle distance. Consequently, a deceleration demand appears at an earlier timing so that a response characteristic to the deceleration control of the vehicle to the deceleration of the preceding vehicle becomes favorable.

In addition, since target inter-vehicle distance D* becomes long due to the deceleration of the preceding vehicle, difference value ΔD of target inter-vehicle distance D* subtracted from actual inter-vehicle distance D indicates a negative value. The negative value of the difference value ΔD directly indicates the elongation of the actual inter-vehicle distance D. It is not at least necessary to be accelerated so largely since the actual inter-vehicle distance D is made long. Or it is not necessary to largely accelerate even if accelerated. As described above, if target inter-vehicle distance D* is calculated using delay processed preceding vehicular velocity $V_{FF}$ in place of the preceding vehicle velocity $V_F$. Since target inter-vehicle distance D* is made shorter than the original value, difference value ΔD between target inter-vehicle distance D* and actual inter-vehicle distance D is made larger than the original value, the inter-vehicle distance is maintained constant, or shortened, the acceleration demand appears at an earlier timing. Consequently, the response characteristic of acceleration control to the acceleration of the preceding vehicle becomes favorable.

Figure 8A:
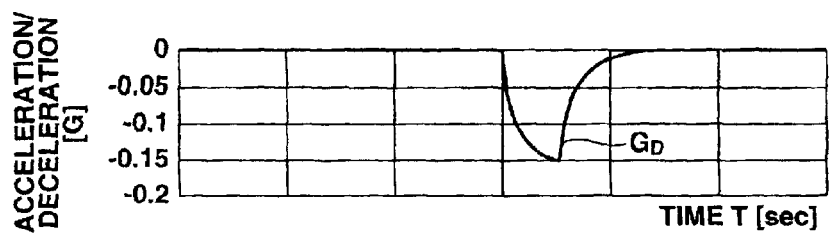
FIGS. 8A, 8B, and 8C are timing charts for explaining an operation of the adaptive cruise control system in the preferred embodiment shown in FIG. 1 when the preceding vehicle which is running ahead of the host vehicle is decelerated.
Figure 8B:
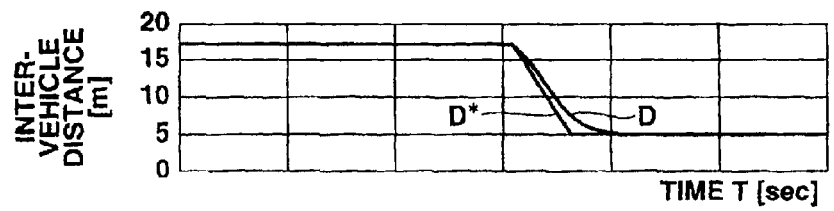
Figure 8C:
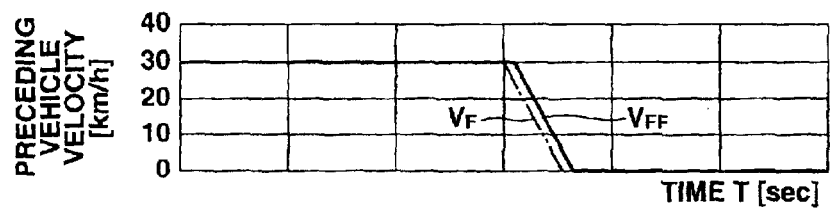

FIGS. 8A through 8C show timing charts of inter-vehicle distance priority target acceleration/deceleration $G_D$, inter-vehicle distance D*, preceding vehicle velocity $V_F$, and delay processed preceding vehicle velocity $V_{FF}$ in the case of the preferred embodiment of the adaptive cruise control system when the preceding vehicle is decelerated from 30 Km/h to 0 Km/h, viz., to the stopped state.

Since, in the preferred embodiment, for the preceding vehicle $V_F$ which is equal to or lower than 40 Km/h at the calculation process of FIG. 4, the delay is the largest since the fifth number of times previously detected preceding vehicle velocity $V_{FF}$ is always set to delay processed preceding vehicle velocity $V_{FF}$.

Hence, with respect to the preceding vehicle $V_F$ which is decelerated at a constant gradient, the delay processed preceding vehicle $V_{FF}$ is delayed as if delay processed preceding vehicle velocity $V_{FF}$ were shifted in parallel thereto. Hence, target inter-vehicle distance D* is accordingly retarded in the same way as delay processed preceding vehicle velocity $V_{FF}$. On the other hand, since actual inter-vehicle distance D becomes shorter than target inter-vehicle distance D* immediately after the preceding vehicle is decelerated, the difference value ΔD of target inter-vehicle distance D* subtracted from actual inter-vehicle distance D indicates negative.

At this time, it becomes necessary to elongate the inter-vehicle distance described above. Hence, the deceleration demand comes at the earlier time. Consequently, the deceleration at the initial stage of the control becomes large and the response characteristic of the vehicular deceleration control becomes favorable.

Figure 9A:
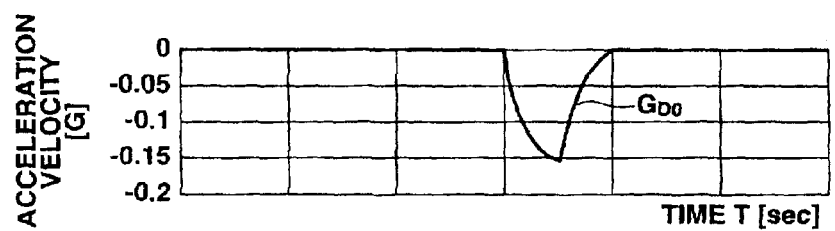
FIGS. 9A, 9B, and 9C are timing charts for explaining an operation of the adaptive cruise control system in a comparative example of the adaptive cruise control system when the preceding vehicle is decelerated.
Figure 9B:
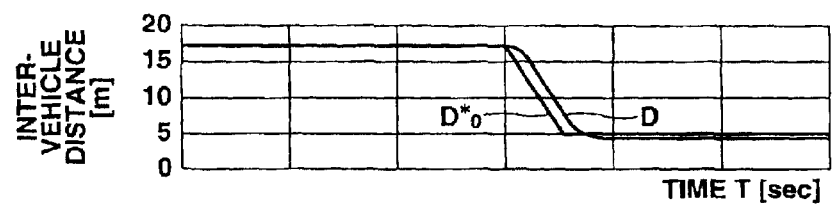
Figure 9C:
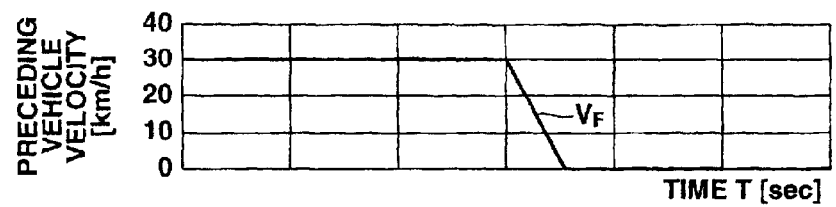

FIGS. 9A, 9B, and 9C show timing charts of inter-vehicle distance priority target acceleration $G_{D0}$, the inter-vehicle distance D, and target inter-vehicle distance $D^*_0$, preceding vehicle velocity $V_F$, and delay processed preceding vehicle velocity $V_{FF}$ in a case of a comparative example in which when no delay process of the preceding vehicle vehicular velocity $V_F$ is carried out when the preceding vehicle is decelerated in the same way as FIGS. 8A, 8B, and 8C. In this case, since actual inter-vehicle distance D is always larger than the target inter-vehicle distance $D^*_0$, the difference value ΔD of subtraction of target inter-vehicle distance $D^*_0$ from actual inter-vehicle distance D is positive. Hence, since actual inter-vehicle distance D is shortened, it is not at least necessary to decelerate as yet. Or it is not necessary to decelerate the vehicle not so largely. This provides a cause of a dull response characteristic of deceleration control.

Figure 10:
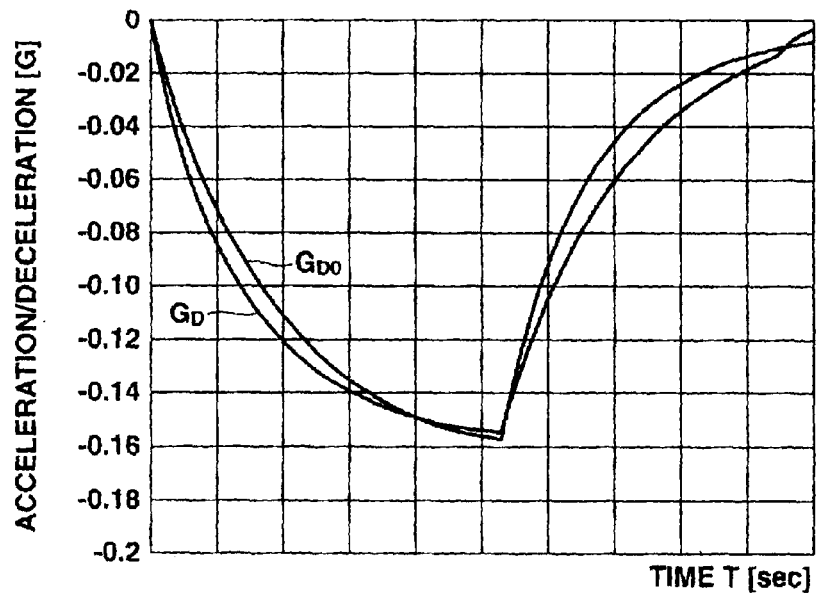
FIG. 10 is a timing chart for explaining variation characteristics of accelerations/decelerations of both of FIGS. 8A and 9A.

FIG. 10 shows a timing chart in which only (inter-vehicle distance priority) target acceleration $G_D$ in the preferred embodiment of the adaptive cruise control system and inter-vehicle distance priority target acceleration/deceleration $G_{D0}$ in the case of the comparative example are mutually overlapped on the same graph. As shown in FIG. 10, immediately after the deceleration start of the preceding vehicle, absolute value of the inter-vehicle distance priority target acceleration/deceleration $G_D$ in the preferred embodiment is larger than the inter-vehicle distance priority target acceleration/deceleration $G_{D0}$ in the case of the comparative example and the response characteristic of the deceleration control becomes favorable.

On the other hand, at the latter half stage of deceleration control, the absolute value of inter-vehicle distance priority target acceleration/deceleration $G_D$ in the preferred embodiment is smaller than inter-vehicle distance priority target acceleration/deceleration $G_{D0}$ in the case of the comparative example and the deceleration control is smoothly converged. In this embodiment, it is not necessary to enlarge the feedback gain. Hence, there is almost no case where the acceleration/deceleration is too sensitive during the ordinary preceding vehicle following control run and the comfortability is worsened.

In the preferred embodiment, as the preceding vehicle velocity $V_F$ becomes lower, the delay becomes larger. In other words, since a dead time to be added to preceding vehicle velocity $V_F$ becomes larger, the deceleration request becomes accordingly faster, an initial response becomes more favorable as the velocity of the preceding vehicle becomes lower so that the deceleration characteristic accommodated to the driver's intention can be obtained. In addition, at the high speed run, the initial response is suppressed. No uncomfortable feeling is given to the vehicular occupant in the host vehicle during such a high-speed run that the deceleration is smooth.

In addition, in the preferred embodiment, no delay is provided for during the host vehicular run at the high speed in excess of 80 Km/h. That is to say, since the response characteristic of deceleration is suppressed during the high-speed run, no uncomfortable feeling is given to the vehicular occupant. A reverse effect appears during the acceleration of the preceding vehicle in the similar manner as described above. In details, since the response characteristic to the deceleration is suppressed during the high speed run, no uncomfortable feeling is given during the high speed run at which the deceleration is smooth. It is noted that the reverse effect of this fact appears during the acceleration of the preceding vehicle as described above.

Figure 11A:
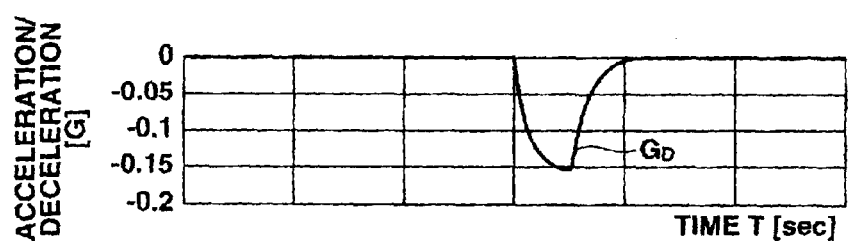
FIGS. 11A, 11B, and 11C are timing charts for explaining another operation of the adaptive cruise control system which is different from that shown in FIGS. 8A through 8C when the preceding vehicle is decelerated.
Figure 11B:
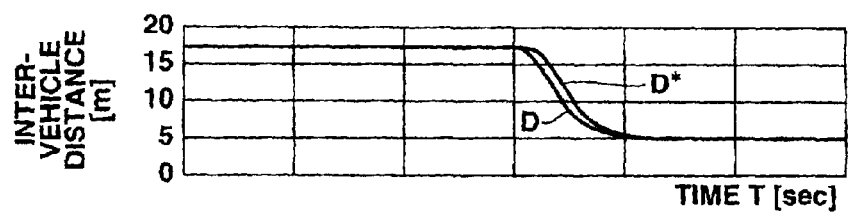
Figure 11C:
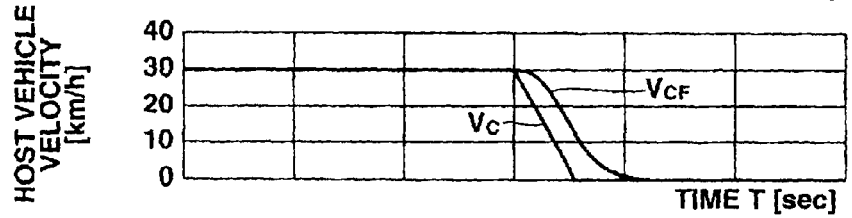

In addition, as described above, when the host vehicle is running to follow the preceding vehicle, the vehicular velocity of the host vehicle is equal to or substantially equal to each other, the vehicular velocity of the host vehicle Vc may be used to calculate target inter-vehicle distance D*. In this case, an object to which the delay is added is the velocity of the host vehicle Vc. FIGS. 11A, 11B, and 11C show timing charts of (inter-vehicle distance priority target) acceleration/deceleration $G_D$, inter-vehicle distance D, and target inter-vehicle distance D*, host vehicle velocity Vc, and delay processed host vehicular velocity $Vc_F$ when the host vehicle is decelerated from 30 Km/h to 0 km/h (namely, the host vehicle is decelerated to the vehicle stopped state) in the same way as shown in FIGS. 8A, 8B, and 8C.

The delay process for the vehicular velocity of the host vehicle Vc in the preferred embodiment is executed in such a way that an object to be delay processed in the calculation process of FIG. 4 is exchanged from the preceding vehicle velocity $V_F$ to vehicular velocity Vc and the delay time to be added to the host vehicular velocity is gradually increased with the decrease in the host vehicular velocity Vc. Hence, a delay processed host vehicular velocity $V_{CF}$ is largely delayed with a gradient of deceleration gradually reduced with respect to the host vehicular velocity Vc gradually reduced at a gradient of a substantially constant value together with the deceleration of the preceding vehicle.

Target inter-vehicle distance D* in accordance with delay processed host vehicular velocity $V_{CF}$ is largely delayed in the same manner as delay processed host vehicle velocity $V_{CF}$. Whereas, since actual inter-vehicle distance D is always considerably small value as compared with target inter-vehicle distance D*, the absolute value of difference value ΔD indicates a large value of a negative value. At this time, as described above, the inter-vehicle distance needs to quickly be elongated. Hence, the deceleration request appears quickly. Consequently, the deceleration at the initial stage of control becomes large so that the response characteristic to the deceleration control of the host vehicle becomes favorable.

Figure 12A:
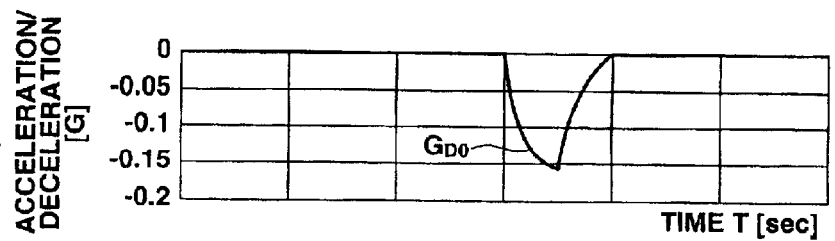
FIGS. 12A, 12B, and 12C are timing charts for explaining another operation of the comparative example to the adaptive cruise control system which is different from that shown in FIGS. 9A through 9C.
Figure 12B:
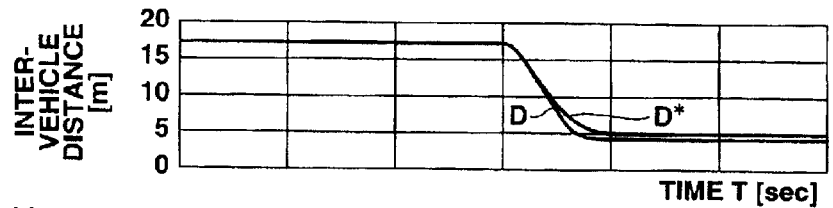
Figure 12C:
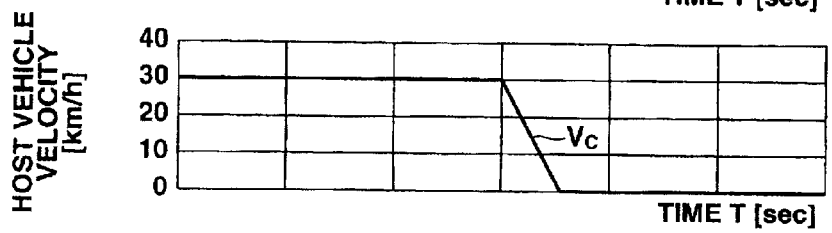

FIGS. 12A, 12B, and 12C show timing charts representing (inter-vehicle distance priority target) acceleration/deceleration $G_{D0}$ of the comparative example when target inter-vehicle distance $D^*_0$ is calculated from host vehicle velocity Vc, inter-vehicle distance D, target inter-vehicle distance $D^*_0$, host vehicular velocity Vc, and delay processed host vehicular velocity $V_{CD}$ when the host vehicle is decelerated to accommodate the host vehicle to the preceding vehicle in the same manner as FIG. 11 and no delay process is carried out for the host vehicular velocity Vc. Since, in this case, actual inter-vehicle distance D becomes slightly shorter than target inter-vehicle distance $D^*_0$, difference value ?D of actual inter-vehicle distance D subtracted from target inter-vehicle distance $D^*_0$ is small in the absolute value thereof and indicates negative. Hence, the deceleration request is delayed so as to provide the cause of the dull response characteristic of deceleration control.

Figure 13:
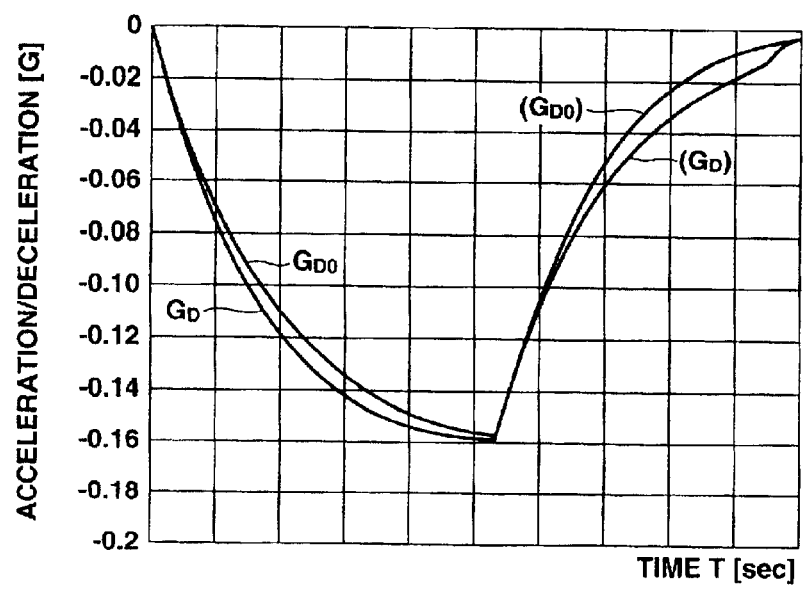
FIG. 13 is a timing chart for explaining variation characteristics of accelerations/decelerations of both of FIGS. 11A and 12A when they are overlapped on the same graph thereof.

FIG. 13 shows a timing chart of (inter-vehicle distance priority target) acceleration/deceleration $G_D$ in the preferred embodiment of FIGS. 11A through 11C and (inter-vehicle distance priority target) acceleration/deceleration $G_{D0}$ of the comparative example as shown in FIGS. 12A through 12C.

As appreciated from FIG. 13, at a time point immediately after the preceding vehicle has started the deceleration, (inter-vehicle distance priority target) acceleration/deceleration $G_D$ in the preferred embodiment is larger in the absolute value than inter-vehicle distance priority target) acceleration $G_{D0}$ in the comparative example and the response characteristic to the deceleration control gives a more favorable result.

On the other hand, at the latter half stage of deceleration control, the inter-vehicle distance priority target acceleration/deceleration $G_D$ is smaller in its absolute value than the (inter-vehicle distance priority target) acceleration $G_{D0}$ in the comparative example and the response characteristic to the deceleration control gives a more favorable result.

On the other hand, at the latter half stage of deceleration control, the inter-vehicle distance priority target acceleration/deceleration $G_D$ is smaller in its absolute value than the (inter-vehicle distance priority target) acceleration/deceleration $G_{D0}$ and the deceleration control is smoothly converged. In addition, it is not necessary to enlarge the feedback gain in the preferred embodiment. Hence, there is no case where the acceleration/deceleration becomes excessively sensitive during the ordinary preceding vehicle following run so that the vehicular comfortability is worsened.

In the preferred embodiment, as the host vehicle velocity Vc becomes smaller, the delay is large. That is to say, the dead time to be added to the host vehicular velocity Vc becomes large. Hence, target inter-vehicle distance D* calculated from host vehicular velocity Vc becomes large. Accordingly, the deceleration request becomes fast. As the host vehicular velocity Vc becomes lower, the initial response becomes more favorable. Hence, the deceleration characteristic which accommodates to the driver's intention can be achieved.

In addition, the initial response at the high speed is suppressed. No uncomfortable feeling is given to the host vehicular occupant during the high speed ran at which the deceleration is smooth. It is noted that the reverse effect to this fact appears in the same manner as the acceleration of the preceding vehicle, as described above.

As described above, step S1 of calculation process shown in FIG. 2 and inter-vehicle distance sensor 12 are constituted by inter-vehicle distance detecting section. In the same way, step S3 of calculation process shown in FIG. 2 is constituted by host vehicle velocity detecting section. Step S15c of the calculation process shown in FIG. 4 is constituted by preceding vehicle velocity detecting section. The whole calculation process shown in FIG. 4 carried out at step S15 of calculation process shown in FIG. 3 is constituted by target inter-vehicle distance setting section. Step S6 of the calculated process shown in FIG. 2 is constituted by vehicular travel control section. Steps S15d to S15p of calculation process shown in FIG. 4 are constituted by delay providing section.

Next, another preferred embodiment of the adaptive cruise control system according to the present invention will be described below.

Figure 14:
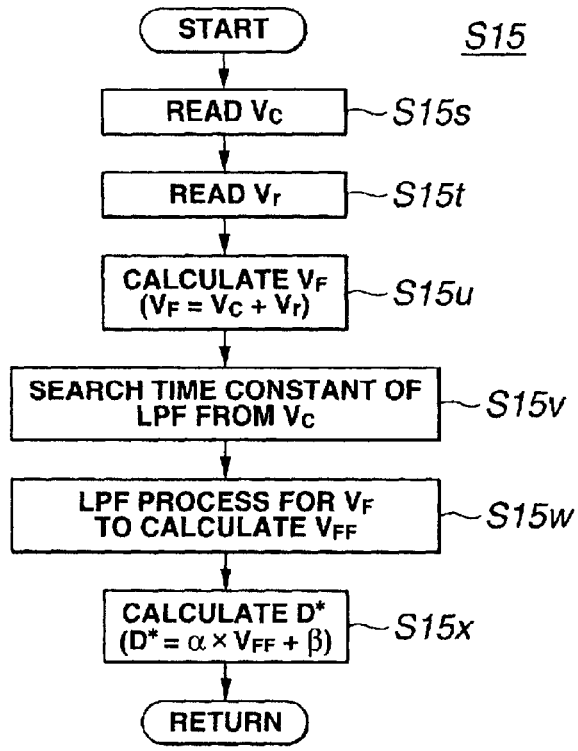
FIG. 14 is a detailed flowchart executed at step S15 in the case of the adaptive cruise control system in another preferred embodiment according to the present invention.

The structure of the vehicle in the other preferred embodiment is generally the same as that in the above-described embodiment. The calculation process to perform the preceding vehicle following control executed by adaptive cruise controller 20 is the same as the flowchart shown in FIG. 2. The detailed flowchart executed at step S5 of calculation process shown in FIG. 2. The detailed flowchart executed at step S5 of calculation process shown in FIG. 2 is the same as shown in FIG. 3. The detailed flowcharts of steps S16, S18, and S19 are the same as those shown in FIGS. 5, 6, and 7. The detailed flowchart of steps S15 of the calculation process shown in FIG. 3 is modified from FIG. 4 to FIG. 14. In the calculation process shown in FIG. 14, host vehicle velocity Vc calculated at step S3 of the calculation process of FIG. 2 is read at step S15s.

Figure 15:
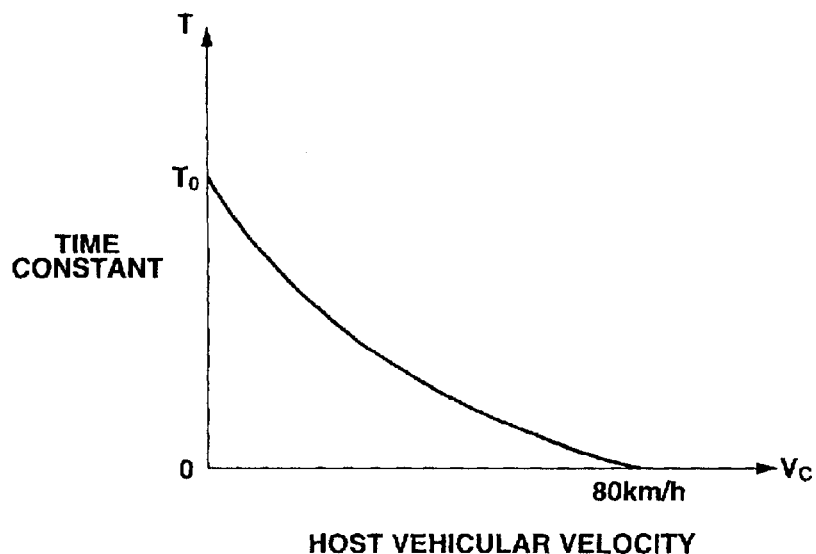
FIG. 15 is a control map on a time constant in an LPF (low-pass filter) used in a calculation process shown in FIG. 14.

At step S15s, adaptive cruise controller 20 reads host vehicle velocity Vc calculated at step S3 of calculation process of FIG. 2. At a step S15t, adaptive cruise controller 20 reads relative velocity Vr calculated at step S2 of the calculation process shown in FIG. 2. It is noted that, at the next step S15u, adaptive cruise controller 20 adds the host vehicular velocity Vc read at step S15s to relative velocity Vr read at step S15t to calculate preceding vehicle velocity $V_F$ ($V_F$=Vc+Vr). At the next step S15v, adaptive cruise controller 20 searches a time constant T of a low-pass filter (LPF) in accordance with host vehicle velocity Vc read at step S15s using a control map shown in FIG. 15. In this embodiment, if the host vehicle velocity Vc is 0 Km/h, time constant T in this preferred embodiment indicates a predetermined value $T_0$ of the velocity. In addition, host vehicle velocity Vc is equal to or larger than 80 Km/h, time constant T in this embodiment indicates zero. During zero to predetermined time constant value $T_0$, as the host vehicular velocity Vc is increased the gradient of decrease is gradually reduced. Then, time constant T is set to be gradually reduced.

At the next step S15w, adaptive cruise controller 20 calculated delay processed preceding vehicle velocity $V_{FF}$ using time constant T set at step S15v by providing a delay process (low-pass filtering) for the preceding vehicle velocity $V_F$ calculated by step S15u. At a step S15x, adaptive cruise controller 20 multiplies delay processed preceding vehicle velocity $V_{FF}$ by inter-vehicle [velocity] time duration α and adds the multiplication result $V_{FF} \times \alpha$ to distance during the vehicle stop β: $D^* = V_{FF} \times \alpha + \beta$. It is noted that for inter-vehicle time duration a and distance during the vehicle stop β[, It is noted that for inter-vehicle speed α and distance during the vehicle stop β], the values described in the BACKGROUND OF THE INVENTION are used.

A general description of the vehicular cruise control system by a plurality of calculation processes including such a calculation process as described above is the same as the first embodiment. On the other hand, target inter-vehicle distance D* is calculated in accordance with the calculation process of FIG. 14 carried out at step S15 of the calculation process of FIG. 3. In this calculation process, target inter-vehicle distance D* using the preceding vehicle velocity $V_F$ in principle is calculated. The delay processed preceding vehicle velocity $V_{FF}$ used for the calculation of target inter-vehicle distance D* has a large delay as the host vehicle velocity becomes low. In details, as the host vehicular velocity Vc (since, at this time, the host vehicle is following the preceding vehicle, host vehicular velocity Vc is equal to or substantially equal to preceding vehicle velocity $V_F$) becomes low, time constant T indicates a large value set in accordance with control map shown in FIG. 15 at step S15v of the calculation process of FIG. 14. Hence, delay processed preceding vehicle velocity $V_{FF}$ to which the low-pass filtering is carried out using time constant T often becomes largely delayed as either the host vehicle velocity Vc or preceding vehicle velocity $V_F$ becomes low. It is noted that since time constant T is zero when host vehicular velocity Vc is in excess of 80 Km/h, no delay occurs with the low-pass filtering and delay processed preceding vehicle velocity $V_{FF}$ is substantially equal to the preceding vehicle velocity $V_F$. In addition, delay processed preceding vehicle velocity $V_{FF}$ is substantially equal to preceding vehicle velocity $V_F$. As described above, the fact that delay processed preceding vehicle velocity $V_{FF}$ is delayed at a later time than actual preceding vehicle velocity $V_F$ means that the variation in target inter-vehicle distance D* is delayed even if the variation in preceding vehicle velocity $V_F$ due to the acceleration/deceleration of the preceding vehicle (since the control time duration is very short, the delay is slight). Hence, even in the other preferred embodiment, the feedback control is carried out so that actual inter-vehicle distance D is made coincident with target inter-vehicle distance D*. Hence, difference value ΔD between target inter-vehicle distance D* and actual inter-vehicle distance D is small in its absolute value as compared with the case where no delay occurs or indicates a negative value even if difference value in nature indicates a positive value, or often indicates a positive value even if the difference value indicates a negative value. For example, even if actual inter-vehicle distance D is long although target inter-vehicle distance D* becomes short due to the deceleration of preceding vehicle, difference value ΔD of target inter-vehicle distance D* subtracted from actual inter-vehicle distance D which represents a positive value means that it needs to shorten the inter-vehicle distance. It is not yet necessary for the host vehicle to be decelerated or it is not necessary for the host vehicle to be decelerated so largely. However, difference value ΔD between target inter-vehicle distance D*and actual inter-vehicle distance D is small in its absolute value, a value in an opposite direction,in other words,is negative value. At this time, it is necessary to maintain the inter-vehicle distance or elongate it. Hence, the deceleration request appears at an earlier time. Consequently, the response characteristic of the deceleration control to the deceleration of preceding vehicle becomes favorable.

In a case where the preceding vehicle is accelerated, difference value ΔD of target inter-vehicle distance D* indicates a negative value so that it becomes necessary to elongate actual inter-vehicle distance D if the negative value is continued. Hence, it is at least not yet necessary for the host vehicle to be accelerated or it is not necessary for the host vehicle to be accelerated so largely eve if accelerated.

Whereas difference value ΔD between target inter-vehicle distance D* and actual inter-vehicle distance D is small in its absolute value or a value in the opposite direction to the original value, i.e., indicates a positive value. This result makes the inter-vehicle distance maintained or makes it shortened. Hence, the acceleration request appears at an earlier timing. Consequently, the response characteristic of the acceleration control of the host vehicle to the acceleration of the preceding vehicle becomes favorable.

Figure 16A:
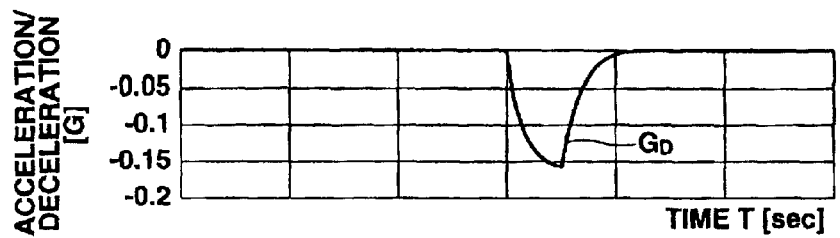
FIGS. 16A, 16B, and 16C are timing charts for explaining a still another operation of the comparative example to the adaptive cruise control system in the other preferred embodiment when the preceding vehicle is decelerated.
Figure 16B:
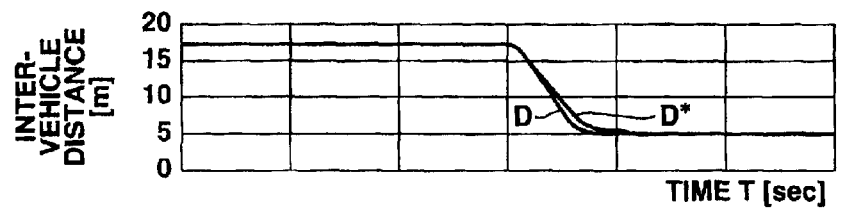
Figure 16C:
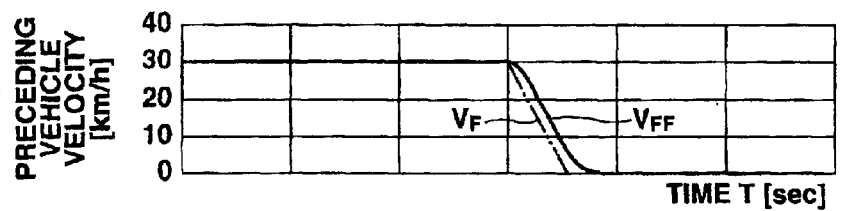

FIGS. 16A, 16B, and 16C show timing charts of (inter-vehicle distance priority target) acceleration/deceleration acceleration $G_D$, inter-vehicle distance D, target inter-vehicle distance D*, preceding vehicle velocity $V_F$, and delay processed preceding vehicle velocity $V_{FF}$ when the preceding vehicle is decelerated from 30 Km/h to 0 Km/h, i.e., to the vehicle stopped state in the same manner as FIGS. 8A, 8B, and 8C. As shown in FIGS. 16A through 16C, delay processed preceding vehicle velocity $V_{FF}$ is largely delayed in the same manner as delay processed preceding vehicle velocity $V_{FF}$. On the other hand, since actual inter-vehicle distance D always indicates a smaller value than target inter-vehicle distance D*, difference value ΔD of target inter-vehicle distance D* from actual inter-vehicle distance D indicates a negative value. At this time, since this results in a quick elongation of the inter-vehicle distance as described above, the deceleration request appears quickly. Consequently, the deceleration at the initial stage of control becomes large. The response characteristic of the vehicular deceleration control becomes favorable.

Figure 17:
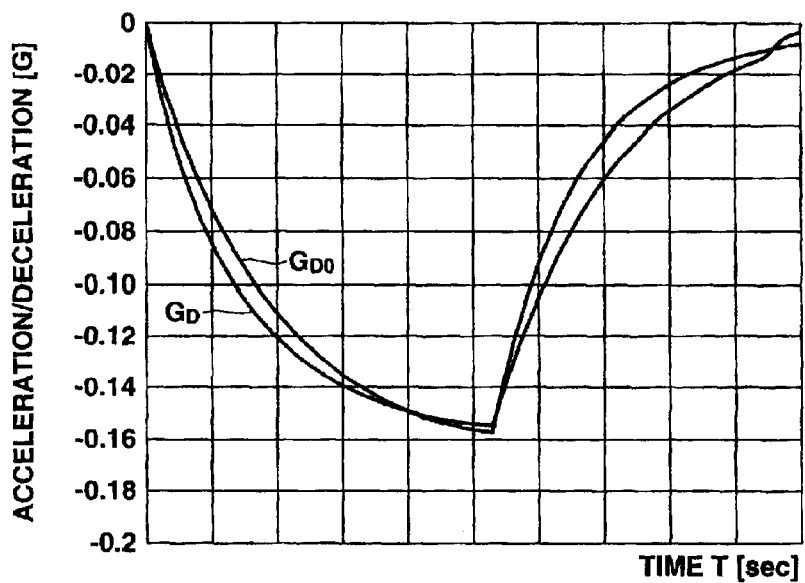
FIG. 17 is a timing chart for explaining variation characteristics of accelerations/decelerations of both of FIGS. 9A and 16A when they are overlapped on the same graph thereof.

FIG. 17 shows a timing chart of both of (inter-vehicle distance priority target) acceleration/deceleration $G_D$ in the case of the other preferred embodiment shown in FIG. 16A and (inter-vehicle distance priority target) acceleration/deceleration $G_{D0}$ in the case of the comparative example derived from FIG. 9A. These acceleration/deceleration $G_D$ and $G_{D0}$ are overlapped on the same graph in FIG. 17.

As appreciated from FIG. 17, at a time immediately after the start of deceleration of the preceding vehicle. (inter-vehicle distance priority target) acceleration/deceleration $G_D$ is larger than (inter-vehicle distance priority target) acceleration/deceleration $G_{D0}$ in the case of the comparative example in their absolute values and the response characteristic of deceleration control becomes more favorable. On the other hand, at the later half stage of deceleration control, acceleration/deceleration $G_D$ in the case of the other embodiment, on the other hand, is smaller in its absolute value than (inter-vehicle distance priority target) acceleration/deceleration $G_{D0}$ in the case of the comparative example. The deceleration response characteristic of the deceleration control becomes more favorable. In addition, the delay is large as the host vehicle velocity Vc becomes slow, in the other preferred embodiment. That is to say, since time constant T of low-pass filter carried out for preceding vehicle velocity $V_F$ (or host vehicle velocity Vc) becomes large, a delay of target inter-vehicle distance D* thus calculated is large so that a deceleration request accordingly becomes fast. As the host vehicular velocity becomes lower, the initial response becomes more favorable. Thus, the deceleration characteristic accommodated to the driver's intention is obtained. At the high speed run, the initial response is suppressed. No uncomfortable feeling is given during the high speed run at which the deceleration is smooth. It is noted that the reverse effect appears during the deceleration of the preceding vehicle as described above. In addition, the same advantages can be obtained when the object to be processed under the low pass filter is exchanged to the host vehicular velocity Vc.

As described above, inter-vehicle distance sensor 12 and step S1 of the calculation process of FIG. 2 constitute inter-vehicle distance detecting section. Step S3 of the calculation process of FIG. 2 is constituted by host vehicular velocity detecting section. Step S15u of the calculation process of FIG. 14 constitutes the preceding vehicle velocity detecting section. The whole calculation process of FIG. 14 executed at step S15 of the calculation process of FIG. 3 constitutes target inter-vehicle distance setting section. Step S6 of calculation process of FIG. 14 constitutes vehicular speed controlling section. Steps S15v and S15w of calculation process of FIG. 14 constitute delay providing section.

It is noted that although, in each embodiment, the microcomputer is used for calculation processing devices, various types of logic circuits may be used in place of the microcomputer. It is also noted that in place of radar unit, photograph device such as CCD (Charge Coupled Device) camera and the inter-vehicle distance to the preceding vehicle may be derived from images photographing a host vehicular forward direction.

The entire contents of a Japanese Patent Application No. 2001-012432 (filed in Japan on Jan. 19, 2001) are herein incorporated by reference. The scope of the invention is defined with reference to the following claims.

What is claimed is:

1. An adaptive cruise control system for an automotive vehicle, comprising:
    an inter-vehicle distance detecting section that detects a presence of a preceding vehicle which is traveling ahead of the vehicle and detects an inter-vehicle distance between the vehicle and the preceding vehicle;
    a vehicular velocity detecting section that detects a velocity of at least one of the vehicle and the preceding vehicle;
    a target inter-vehicle distance setting section that sets a target inter-vehicle distance on the basis of said velocity of at least one of the vehicle and the preceding vehicle;
    a vehicular traveling speed controlling section that controls a traveling state of the vehicle on the basis of the detected inter-vehicle distance and the target inter-vehicle distance; and
    a delay providing section that provides a delay independent from any inherent delay in said vehicle velocity detection section for said velocity of at least one of the vehicle and the preceding vehicle, the delay provided detected velocity being used to set the target inter-vehicle distance, the target inter-vehicle distance setting section setting the target inter-vehicle distance on the basis of the detected velocity for which the delay is provided by the delay providing section.

2. An adaptive cruise control system for an automotive vehicle as claimed in claim 1, wherein the delay providing section provides a dead time for said velocity of at least one of the vehicle and preceding vehicle used to set the target inter-vehicle distance.

3. An adaptive cruise control system for an automotive vehicle as claimed in claim 2, wherein the delay providing section provides a larger dead time for said velocity of at least one of the vehicle and preceding vehicle used to set the target inter-vehicle distance as either one of the velocity of the vehicle or the velocity of the preceding vehicle becomes smaller than the other.

4. An adaptive cruise control system for an automotive vehicle as claimed in claim 2, wherein the delay providing section carries out a low-pass filtering for said velocity of at least one of the vehicle and the preceding vehicle used to set the target inter-vehicle distance if said velocity is equal to or lower than a predetermined value.

5. An adaptive cruise control system for an automotive vehicle as claimed in claim 4, wherein the delay providing section provides a largest dead time for said velocity of at least one of the vehicle and the preceding vehicle used to set the target inter-vehicle distance when either one of the velocity of the vehicle or the velocity of the preceding vehicle is equal to or lower than a first predetermined velocity value, provides a second largest dead time for said velocity of at least one of the vehicle and the preceding vehicle used to set the target inter-vehicle distance when either one of the velocity of the vehicle or the velocity of the preceding vehicle is higher than the first predetermined velocity value but is equal to or lower then a second predetermined velocity value, provides a third largest dead time for said velocity at least one of the vehicle and the preceding vehicle used to set the target inter-vehicle distance when either one of the velocity of the vehicle or the velocity of the preceding vehicle is higher than the second predetermined velocity value but is equal to or lower than a third predetermined velocity value, provides a fourth largest dead time for said velocity of at least one of the vehicle and the preceding vehicle used to set the target inter-vehicle distance when either one of the velocity of the vehicle or the velocity of the preceding vehicle is higher than the third predetermined velocity value but is equal to or lower than a fourth predetermined velocity value, and provides a fifth largest dead time for said velocity of at least one of the vehicle and the preceding vehicle used to set the target inter-vehicle distance when either one of the velocity of the vehicle or the velocity of the preceding vehicle is higher than the fourth predetermined velocity value but is equal to or lower than a fifth predetermined velocity value.

6. An adaptive cruise control system for an automotive vehicle as claimed in claim 5, wherein the delay providing section provides a fifth control number of times previously detected velocity of the preceding vehicle $V_{F5}$ for a detected velocity of the preceding vehicle $V_{FF}$ used to set the target inter-vehicle distance when a presently detected velocity of the preceding vehicle $V_F$ is equal to or lower than the first predetermined velocity value, provides a fourth control number of times previously detected velocity of the preceding vehicle $V_{F4}$ for the detected velocity of the preceding vehicle $V_{FF}$ used to set the target inter-vehicle distance when the presently detected velocity of the preceding vehicle $V_F$ is higher than the first predetermined velocity value but is equal to or lower than the second predetermined velocity value, provides a third control number of times previously detected velocity of the preceding vehicle $V_{F3}$ for the detected velocity of the preceding vehicle $V_{FF}$ used to set the target inter-vehicle distance when the presently detected velocity of the preceding vehicle $V_F$ is higher than the second predetermined velocity value but is equal to or lower than the third predetermined velocity value, provides a second control number of times previously detected velocity of the preceding vehicle $V_{F2}$ for the detected velocity of the preceding vehicle $V_{FF}$ used to set the target inter-vehicle distance when the presently detected velocity of the preceding vehicle $V_F$ is higher than the third predetermined velocity value but is equal to or lower than the fourth predetermined velocity value, and provides a once control number of time previously detected preceding vehicle $V_{F1}$ for the detected velocity of the preceding vehicle $V_{FF}$ used to set the target inter-vehicle distance when the detected velocity of the preceding vehicle is higher than the, fourth predetermined velocity value but is equal to or lower than the fifth predetermined velocity value.

7. An adaptive cruise control system for an automotive vehicle as claimed in claim 6, wherein the target inter-vehicle distance setting section sets the target inter-vehicle distance D* as follows: D* = $\alpha \cdot V_{FF} + \beta$, wherein $V_{FF}$ denotes the detected velocity of the preceding vehicle for which the delay is processed, $\alpha$ denotes a predetermined inter-vehicle time duration, and $\beta$ denotes a predetermined distance at a time of a stop of the vehicle to reach to a position of the preceding vehicle and wherein the adaptive cruise control system further comprises: a difference value calculating section that calculates a difference of the set target inter-vehicle distance D* from the detected inter-vehicle distance D as follows: $\Delta D = D - D^*$; an inter-vehicle distance priority target acceleration/deceleration $G_D$ as follows: $G_D = F_1 \cdot \Delta D$, wherein $F_1$ denotes a predetermined feedback gain; a target vehicular velocity calculating section that calculates a target velocity of the vehicle Vc* on the basis of a set vehicle speed Vs; a vehicular velocity priority target acceleration/deceleration calculating section that calculates a vehicular velocity priority target acceleration/deceleration $G_v$ on the basis of a difference between the target velocity of the vehicle Vc* and the detected velocity of the vehicle Vc; a target acceleration/deceleration calculating section that calculates a target acceleration/deceleration G* on the basis of the target inter-vehicle distance priority acceleration/deceleration $G_D$, the vehicular velocity priority acceleration/deceleration $G_v$, and whether the inter-vehicle distance detecting section detects the presence of the preceding vehicle; and an acceleration controlling section that performs an acceleration control of the vehicle on the basis of the target acceleration/deceleration G*.

8. An adaptive cruise control system for an automotive vehicle as claimed in claim 1, wherein the delay providing section carries out a low-pass filtering for said velocity of at least one of the vehicle and the preceding vehicle used to set the target inter-vehicle distance.

9. An adaptive cruise control system for an automotive vehicle as claimed in claim 8, wherein a time constant of the low-pass filter is set to become larger as said velocity of at least one of the vehicle and the preceding vehicle used to set the target inter-vehicle distance becomes lower.

10. An adaptive cruise control system for an automotive vehicle as claimed in claim 9, wherein the time constant T of the low-pass filter is set to give a maximum value T0 for the velocity of the vehicle used to set the target inter-vehicle distance when said velocity of the vehicle Vc is zero, is set to becomes smaller as the velocity of the vehicle Vc is increased, and is set to zero when the velocity of the vehicle Vc becomes equal to the predetermined value.

11. An adaptive cruise control system for an automotive vehicle as claimed in claim 8, wherein the delay providing section carries out a low-pass filtering for said velocity of at least one of the vehicle and the preceding vehicle used to set the target inter-vehicle distance if said velocity is equal to or lower than a predetermined value.

12. An adaptive cruise control system for an automotive vehicle as claimed in claim 1, wherein the velocity detecting section comprises: a vehicular velocity detecting section that detects the velocity of the vehicle; and a preceding vehicle velocity detecting section that detects the velocity of the preceding vehicle on the basis of a relative velocity of the vehicle to the preceding vehicle and the velocity of the vehicle.

13. An adaptive cruise control method for an automotive vehicle, comprising:

detecting a presence of a preceding vehicle which is traveling ahead of the vehicle;

detecting an inter-vehicle distance between the vehicle and the preceding vehicle;

detecting a velocity of at least one of the vehicle and the preceding vehicle;

controlling a traveling state of the vehicle on the basis of the detected inter-vehicle distance and a target inter-vehicle distance;

providing a delay for said velocity of at least one of the vehicle and the preceding vehicle used to set the target inter-vehicle distance at a time of a detection of said velocity, said delay being independent from any inherent delay in said vehicle velocity detection section; and setting the target inter-vehicle distance on the basis of said velocity of at least one of the vehicle and the preceding vehicle for which the delay is provided.

14. An adaptive cruise control system for an automotive vehicle, comprising:

inter-vehicle distance detecting means for detecting a presence of a preceding vehicle which is traveling ahead of the vehicle and detecting an inter-vehicle distance between the vehicle and the preceding vehicle;

vehicular velocity detecting means for detecting a velocity of at least one of the vehicle and the preceding vehicle;

target inter-vehicle distance setting means for setting a target inter-vehicle distance on the basis of said velocity of at least one of the vehicle and the preceding vehicle;

vehicular traveling speed controlling means for controlling a traveling state of the vehicle on the basis of the detected inter-vehicle distance and the target inter-vehicle distance; and delay providing means for providing a delay independent from any inherent delay in said vehicle velocity detection section for said velocity of at least one of the vehicle and the preceding vehicle used to set the target inter-vehicle distance at a time of a detection of said velocity, the target inter-vehicle distance setting means setting the target inter-vehicle distance on the basis of said velocity for which the delay is provided by the delay providing means.

* * * * *